United States Patent
Chu et al.

(10) Patent No.: US 7,472,311 B1
(45) Date of Patent: Dec. 30, 2008

(54) METHOD AND APPARATUS FOR TESTING AN INTERFACE BETWEEN A TCP OFFLOAD ENGINE AND AN OPERATING SYSTEM

(75) Inventors: Hsiao-Keng J. Chu, Palo Alto, CA (US); Eric T. Cheng, San Mateo, CA (US); Sunay Tripathi, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 503 days.

(21) Appl. No.: 11/251,360

(22) Filed: Oct. 14, 2005

(51) Int. Cl.
*G06F 11/00* (2006.01)

(52) U.S. Cl. .............. 714/30; 714/28; 703/23

(58) Field of Classification Search ........... 714/30, 714/38, 28; 703/23, 24, 28
See application file for complete search history.

(56) References Cited

U.S. PATENT DOCUMENTS 7,224,692 B2 * 5/2007 Fan ..................... 370/394
7,324,540 B2 * 1/2008 Vangal et al. ............ 370/419

OTHER PUBLICATIONS

Westrelin et al. "Studying network protocol offload with emulation: approach and preliminary results." Proceedings of 12th Annual IEEE Symposium on High Performance Interconnects. Aug. 25-27, 2004.*

* cited by examiner

*Primary Examiner*—Robert Beausoliel
*Assistant Examiner*—Philip Guyton
(74) *Attorney, Agent, or Firm*—Park, Vaughan & Fleming, LLP

(57) ABSTRACT

One embodiment of the present invention provides a system that can test an interface between a TCP (Transmission Control Protocol) Offload Engine (TOE) and an OS (Operating System) that has a TCP software stack. Note that the TOE is a specialized integrated circuit which allows TCP-related computations to be offloaded from the processor that executes the OS. During operation, the system receives a request from the OS to perform a TCP-related computation on the TOE, wherein the TCP-related computation is associated with a portion of the TCP software stack. The system then performs the TCP-related computation by executing the portion of the TCP software stack on a processor, which can either be the same as the one that is executing the OS, or it can be a different processor. Note that performing the TCP-related computation on a processor, instead of the TOE, allows the interface between the TOE and the OS to be tested without requiring an actual TOE chip.

13 Claims, 2 Drawing Sheets

METHOD AND APPARATUS FOR TESTING AN INTERFACE BETWEEN A TCP OFFLOAD ENGINE AND AN OPERATING SYSTEM

FIELD OF THE INVENTION

The present invention relates to computer networking. More specifically, the present invention relates to a method and an apparatus for testing an interface between a TCP (Transmission Control Protocol) offload engine and an OS (Operating System).

BACKGROUND

Related Art

The exponential increase in networking speeds has brought, in addition to well known advantages, new bottlenecks in computers and network devices. In particular, processors are spending an ever increasing proportion of their time on networking tasks, leaving less time available for other work.

Processing requirements for networking tasks has increased due to a number of reasons. High end computing architectures are evolving from SMP (Symmetric Multi-Processor) based designs to designs that connect a number of cheap servers with high speed communication links. Such distributed architectures typically require processors to spend a large amount of time processing data packets. Furthermore, emerging data storage solutions, multimedia applications, and network security applications are also causing processors to spend an ever-increasing amount of time on networking related tasks.

TCP (Transmission Control Protocol) is commonly used in these bandwidth intensive applications at speeds that can be as high as a few gigabits per second. Since TCP is a complex protocol that has traditionally been implemented in software, these applications can cause the processor to spend a significant amount of time performing TCP-related computations.

To alleviate this computational burden, a number of TCP Offload Engines (TOEs) have been proposed that offload TCP-related computations from the processor. Note that a TOE is typically implemented as a specialized integrated circuit that communicates with the processor over a system bus.

Unfortunately, the computer industry is still debating as to how much TCP-related computation should be offloaded to the TOE. Different companies are offering different flavors of TOEs, each with vastly different capabilities. This has made it very difficult for system designers to test OS software with these different flavors of TOEs.

Note that a TOE typically cannot be interfaced with an OS using a standard driver interface (e.g., Data Link Provider Interface) because the TOE offloads TCP-related computations which are usually part of the kernel code.

The interface between the TOE and the OS needs to be thoroughly tested before further system level tests can be performed. Specifically, there are many higher layer protocols and applications that use TOE functionality which are typically subjected to a battery of regression tests before they can be introduced in the market. However, since companies usually want to introduce new products to the market as soon as possible, it is very important to be able to perform such regression tests while these TOE chips are being developed. Note that prerelease versions of TOE chips usually have a number of serious bugs. Hence, performing system level tests using prerelease versions of TOE chips can be very time consuming and frustrating because it can be very difficult to determine whether a test failure occurred due to a bug in the TOE chip or whether it occurred due to a bug in the software under test.

Hence, what is needed is a method and an apparatus to test an interface between a TOE and an OS without the above-described problems.

SUMMARY

One embodiment of the present invention provides a system that can test an interface between a TCP (Transmission Control Protocol) Offload Engine (TOE) and an OS (Operating System) that has a TCP software stack. Note that the TOE is a specialized integrated circuit which allows TCP-related computations to be offloaded from the processor that executes the OS. During operation, the system receives a request from the OS to perform a TCP-related computation on the TOE, which is associated with a portion of the TCP software stack. The system then performs the TCP-related computation by executing the portion of the TCP software stack on a processor, which can either be the same as the one that is executing the OS, or it can be a different processor. Note that performing the TCP-related computation on a processor, instead of the TOE, allows the interface between the TOE and the OS to be tested without requiring an actual TOE chip.

In a variation on this embodiment, the system performs the TCP-related computation by executing the portion of the TCP software stack which is already present in the OS. This allows the interface to be tested without requiring emulation software that is specifically created to emulate the behavior of the TOE.

In a variation on this embodiment, the TCP-related computation can involve generating a checksum, segmenting a message into a set of protocol data units, or assembling a set of protocol data units to form a message.

In a variation on this embodiment, the system executes the TCP-related computations on a second processor in a symmetric multiprocessing system which is different from the processor that is executing the OS.

In a further variation on this embodiment, the system estimates the performance improvement due to the TOE by measuring the utilization of the second processor.

In a variation on this embodiment, the system is used to quickly evaluate a new TOE feature by making appropriate modifications to the TCP software stack.

In a variation on this embodiment, the system is used to perform regression tests for software that uses TOE functionality, wherein the regression tests are performed without using an actual TOE chip.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Networking Software Stack

Communication between two nodes of a network is typically accomplished using a layered software architecture, which is often referred to as a networking software stack or simply a networking stack.

Each layer is usually associated with a set of protocols which define the rules and conventions for processing packets in that layer. Each lower layer performs a service for the layer immediately above it to help with processing packets. Furthermore, each layer typically adds a header (control data) that allows peer layers to communicate with one another.

At the sender, this process of adding layer specific headers is usually performed at each layer as the payload moves from higher layers to lower layers. The receiving host generally performs the reverse of this process by processing headers of each layer as the payload moves from the lowest layer to the highest layer.

Figure 1:
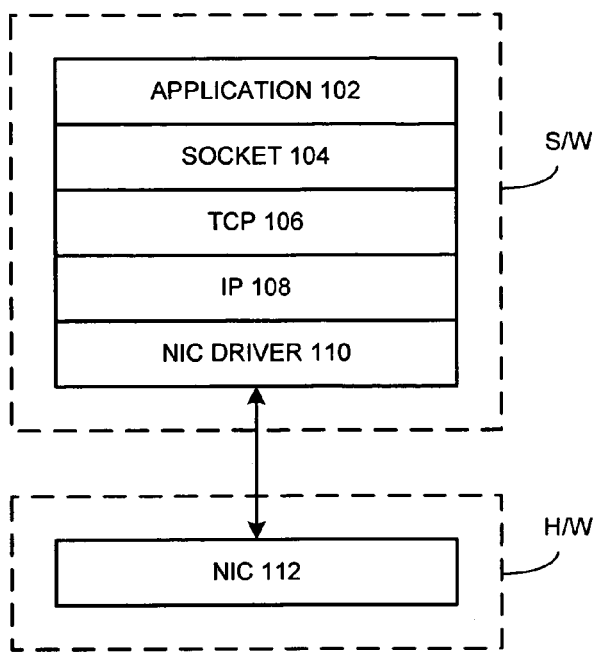
FIG. 1 illustrates the layers of a networking software stack for a system that does not use a TOE in accordance with an embodiment of the present invention.

FIG. 1 illustrates the layers of a networking software stack for a system that does not use a TOE in accordance with an embodiment of the present invention.

Application layer 102 typically contains networking applications that communicate with other networking applications over a network. In a TCP/IP network, applications often communicate with one another using a socket layer 104 which provides a convenient abstraction for communicating with remote applications. The socket layer 104 usually employs a transport protocol, such as TCP 106, to communicate with its peers. TCP 106, in turn, uses IP 108 to send/receive packets to/from other nodes in the network. The IP 108 layer typically sends and receives data using a NIC 112 which is controlled by a NIC driver 110.

As is true of any data processing function, a networking layer can be implemented using hardware or software or a combination thereof. The decision implement a specific networking layer in hardware or software is typically based on a tradeoff between performance and cost.

In the networking stack shown in FIG. 1, all TCP-related computation is performed in software. The NIC 112 is typically capable of only performing rudimentary operations that are necessary for sending and receiving packets of a data link layer protocol, such as Ethernet. The reason TCP-related computations have traditionally been implemented in software is because transport layer protocols, such as TCP, contain many complex computations that can be costly to implement in silicon. Furthermore, in the past, data rates have been low enough to justify performing TCP-related computations in the processor.

However, emerging networking applications and system architectures are causing the processor to spend an ever-increasing amount of time performing TCP-related computations. Moreover, rapid advances in the design and manufacturing of integrated circuits have drastically reduced the cost for implementing TCP-related computations in silicon. These developments have led to the introduction of TCP Offload engines that offload TCP-related computations from the processor.

TCP Offload Engine

TCP was originally designed for enabling reliable communication over unreliable low speed networks. Nowadays TCP is now often used for communicating over extremely high speed communication networks. At such high data rates, TCP-related computations can overwhelm a processor. This is why processing tasks related to TCP are being moved to an integrated chip which is often called a TCP Offload Engine (TOE).

Unfortunately, the industry is still debating as to how much TCP-related computation should be offloaded to the TOE. For example, some TOE implementations may only offload fragmentation/reassembly and checksum computations, which are some of the most computationally intensive operations that TCP performs. On the other hand, other TOE implementations may offload almost all TCP-related computations including connection management. Due to the large variation in the capabilities of these different TOE implementations, it is very difficult to test the interface between the TOE and the OS because integrating a new TOE flavor with the kernel can require developing and integrating a new TOE driver with the kernel code, which can be very time consuming and error prone.

Figure 2A:
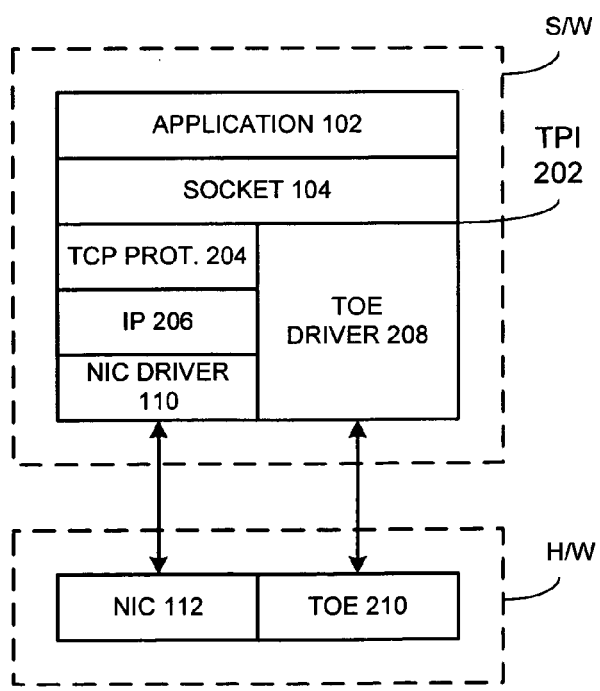
FIG. 2A illustrates the layers of a networking software stack for a system that uses a TOE in accordance with an embodiment of the present invention.

FIG. 2A illustrates the layers of a networking software stack for a system that uses a TOE in accordance with an embodiment of the present invention.

Note that interfacing a TOE with an OS usually does not require changes to the application layer 102 or the socket layer 104, which are shown in FIG. 2A exactly the same way as they were shown in FIG. 1. On the other hand, the TCP layer 106 and the IP layer 108 shown in FIG. 1 need to be changed to offload TCP-related computation to the TOE.

Specifically, an interface between the TCP layer and the socket layer is called the TPI (Transport Provider Interface) 202. This interface provides an abstraction of the transport layer to the socket layer. The TCP layer 204 comprises all the functions that are specific to TCP.

TOE driver 208 allows the OS to control the TOE 210. A TOE typically does not offload the TPI 202. Instead, it usually offloads the computations performed in the TCP layer 204. Hence, the TPI 202 can be a natural place to define a TOE/OS interface.

Specifically, in one embodiment, the interface between the TOE 210 and the OS comprises the TPI 202. In another embodiment, the TOE/OS interface can further include interfaces between the TOE driver 208 and other networking layers or software modules, such as the TCP 204 layer, the IP layer 206, and the NIC driver 110.

Figure 2B:
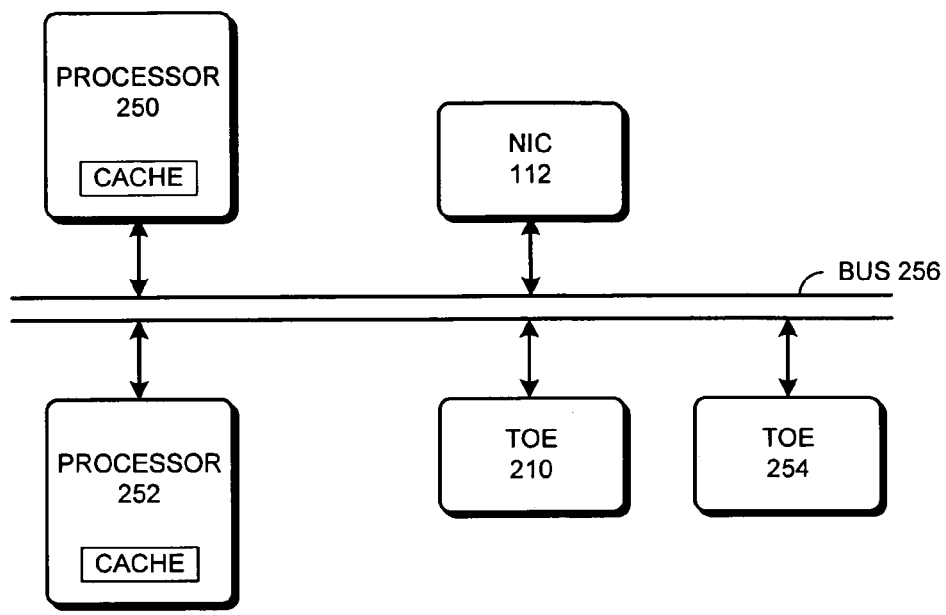
FIG. 2B illustrates a system that uses a TOE to offload TCP-related computations from a processor in accordance with an embodiment of the present invention.

FIG. 2B illustrates a system that uses a TOE to offload TCP-related computations from a processor in accordance with an embodiment of the present invention.

The system illustrated in FIG. 2B comprises multiple processors 250 and 252 which can be part of an SMP. The system further comprises NIC 112, and TOEs 210 and 254. All of these components communicate with one another via the system bus 256. (The system shown in FIG. 2B is for illustration purposes only. Specifically, it will be apparent to one skilled in the art that the present invention is also applicable to other systems that have different architectures or that have different number of processors, NICs, and TOEs.)

Process for Testing an Interface Between a TOE and an OS

As mentioned before, testing the interface between a TOE and an OS is very challenging because of many reasons. First, since the industry is still debating as to how much TCP-related computation should be offloaded to the TOE, a number of TOE implementations have been proposed with very different capabilities. Second, present techniques for interfacing a TOE with an OS typically require integrating a new TOE driver with the OS kernel which is very disadvantageous because it can introduce serious bugs in the system. Third, using prerelease versions of TOE chips to test the TOE/OS interface is very disadvantageous because it can be very difficult to determine whether a test failure occurred due to a bug in the TOE chip or whether it was due to a bug in the TOE/OS interface.

Note that an OS typically has a built-in TCP software stack, as shown in FIG. 1. Furthermore, note that a TOE chip essentially implements portions of the TCP software stack in silicon. In other words, the TCP-related computations performed by a TOE chip are associated with portions of the TCP software stack. Hence, the behavior of a TOE chip can be emulated by executing the associated portions of the TCP software stack on a general purpose processor.

More specifically, an interface between a TOE and an OS can be tested by emulating the behavior of the TOE chip by executing the associated portions of the TCP software stack on a general purpose processor. Note that this approach for testing an interface between a TOE and an OS can overcome the problems that afflict present techniques for testing TOE/OS interfaces. This insight can be used to devise techniques and systems that can test an interface between a TOE and an OS without the above-described problems.

One embodiment of the present invention can emulate different flavors of TOE chips by executing different portions of the TCP software stack on a processor. For example, if a TOE implementation only performs fragmentation/reassembly and checksum computations, then the portions in the TCP software stack that are associated with these functions can be executed to emulate the TOE chip. On the other hand, if a TOE implementation performs almost all TCP-related functions, then most of the TCP software stack can be executed to emulate the behavior of the TOE chip. Furthermore, note that since most operating systems have a built-in TCP software stack, this technique for testing a TOE/OS interface does not require creating emulation software that is specifically created to emulate the behavior of the TOE.

Additionally, since this technique emulates the behavior of the TOE chip using portions of the TCP software stack, it does not require a TOE driver to be written for each TOE implementation, nor does it require the TOE driver to be integrated with the kernel.

Moreover, this technique does not require an actual TOE chip to test a TOE/OS interface. In this way, one embodiment of the present invention overcomes the problems that afflict current TOE/OS interface testing methodologies.

Figure 3:
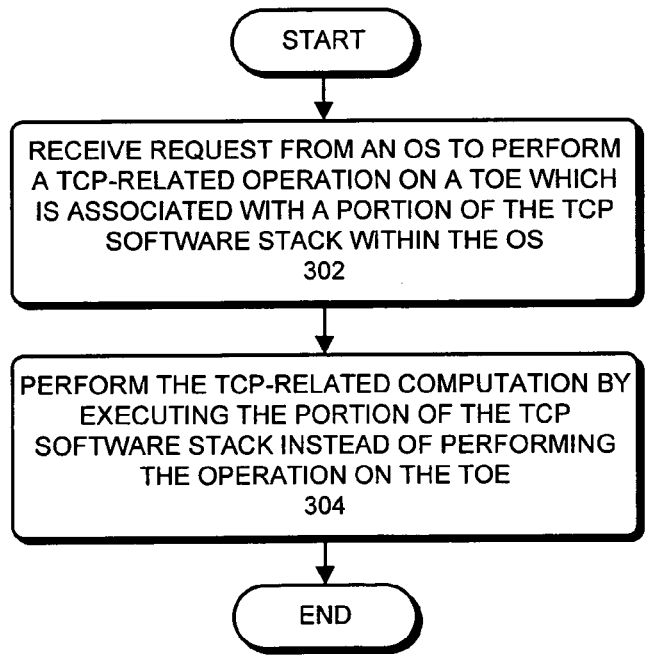
FIG. 3 presents a flowchart that illustrates a process for testing an interface between a TOE and an OS in accordance with an embodiment of the present invention.

FIG. 3 presents a flowchart that illustrates a process for testing an interface between a TOE and an OS in accordance with an embodiment of the present invention.

The process typically begins by receiving a request from an OS to perform a TCP-related operation on a TOE which is associated with a portion of the TCP software stack within the OS (step 302).

Note that an OS can have multiple TCP software stacks, wherein each TCP stack implements a flavor (or version) of TCP. In such situations, the TOE will be associated with a portion of the TCP software stack that implements the same flavor of TCP as the TOE.

Next, the system performs the TCP-related computation by executing the portion of the TCP software stack instead of performing the TCP-related operation on the TOE (step 304).

Note that the system can perform TCP-related computations either on the same processor that is executing the OS, or on another processor in a symmetric multiprocessing system. If the TCP-related computations are performed on a separate processor, the performance improvement of the TOE can be estimated using the utilization of the processor that is performing the TCP-related computations.

An embodiment of the present invention can be used to perform regression tests for software that uses TOE functionality, wherein the regression tests are performed without using an actual TOE chip. Furthermore, an embodiment can be used to quickly evaluate a new TOE feature by making appropriate modifications to the TCP software stack.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for testing an interface between a TCP (Transmission Control Protocol) Offload Engine (TOE) and an OS (Operating System) that has a TCP software stack, wherein the TOE is a specialized integrated circuit which allows TCP-related computations to be offloaded from a first processor that executes the OS, the method comprising:
   receiving a request from the OS to perform a TCP-related computation on the TOE, wherein the TCP-related computation is associated with a portion of the TCP software stack; and
   performing the TCP-related computation by executing the portion of the TCP software stack on a second processor;
   wherein performing the TCP-related computation on the second processor, instead of the TOE, allows the interface between the TOE and the OS to be tested without requiring an actual TOE chip; and
   wherein the first processor and the second processor are the same processor.

2. The method of claim 1, wherein performing the TCP-related computation by executing the portion of the TCP software stack which is already present in the OS allows the interface to be tested without requiring emulation software that is specifically created to emulate the behavior of the TOE.

3. The method of claim 1, wherein the TCP-related computation can involve:
   generating a checksum;
   segmenting a message into a set of protocol data units; or
   assembling a set of protocol data units to form a message.

4. The method of claim 1, wherein the method is used to quickly evaluate a new TOE feature by making appropriate modifications to the TCP software stack.

5. The method of claim 1, wherein the method is used to perform regression tests for software that uses TOE functionality, wherein the regression tests are performed without using an actual TOE chip.

6. A computer-readable storage device storing instructions that when executed by a computer cause the computer to perform a method for testing an interface between a TCP (Transmission Control Protocol) Offload Engine (TOE) and an OS (Operating System) that has a TCP software stack, wherein the TOE is a specialized integrated circuit which allows TCP-related computations to be offloaded from a first processor that executes the OS, the method comprising:
 receiving a request from the OS to perform a TCP-related computation on the TOE, wherein the TCP-related computation is associated with a portion of the TCP software stack; and
 performing the TCP-related computation by executing the portion of the TCP software stack on a second processor;
 wherein performing the TCP-related computation on the second processor, instead of the TOE, allows the interface between the TOE and the OS to be tested without requiring an actual TOE chip; and
 wherein the first processor and the second processor are the same processor.

7. The computer-readable storage device of claim 6, wherein performing the TCP-related computation by executing the portion of the TCP software stack which is already present in the OS allows the interface to be tested without requiring emulation software that is specifically created to emulate the behavior of the TOE.

8. The computer-readable storage device of claim 6, wherein the TCP-related computation can involve:
 generating a checksum;
 segmenting a message into a set of protocol data units; or
 assembling a set of protocol data units to form a message.

9. The computer-readable storage device of claim 6, wherein the method is used to quickly evaluate a new TOE feature by making appropriate modifications to the TCP software stack.

10. The computer-readable storage device of claim 6, wherein the method is used to perform regression tests for software that uses TOE functionality, wherein the regression tests are performed without using an actual TOE chip.

11. An apparatus for testing an interface between a TCP (Transmission Control Protocol) Offload Engine (TOE) and an OS (Operating System) that has a TCP software stack, wherein the TOE is a specialized integrated circuit which allows TCP-related computations to be offloaded from a first processor that executes the OS, the apparatus comprising:
 a receiving mechanism configured to receive a request from the OS to perform a TCP-related computation on the TOE, wherein the TCP-related computation is associated with a portion of the TCP software stack; and
 a second processor configured to perform the TCP-related computation by executing the portion of the TCP software stack;
 wherein performing the TCP-related computation on the second processor, instead of the TOE, allows the interface between the TOE and the OS to be tested without requiring an actual TOE chip; and
 wherein the first processor and the second processor are the same processor.

12. The apparatus of claim 11, wherein performing the TCP-related computation by executing the portion of the TCP software stack which is already present in the OS allows the interface to be tested without requiring emulation software that is specifically created to emulate the behavior of the TOE.

13. The apparatus of claim 11, wherein the TCP-related computation can involve:
 generating a checksum;
 segmenting a message into a set of protocol data units; or
 assembling a set of protocol data units to form a message.

* * * * *